United States Patent

Tzikas et al.

Patent Number: 5,936,072
Date of Patent: Aug. 10, 1999

[54] REACTIVE DYES, THEIR PREPARATION AND USE

[75] Inventors: Athanassios Tzikas, Pratteln, Switzerland; Herbert Klier, Efringen-Kirchen, Germany

[73] Assignee: Ciba Specialty Chemicals Corporation, Tarrytown, N.Y.

[21] Appl. No.: 09/041,183

[22] Filed: Mar. 12, 1998

[30] Foreign Application Priority Data

Mar. 18, 1997 [CH] Switzerland ............................. 0653/97

[51] Int. Cl.$^6$ .................... C09B 62/465; C09B 62/04; D06P 1/38
[52] U.S. Cl. ............................................ 534/618
[58] Field of Search ............................................ 534/618

[56] References Cited

U.S. PATENT DOCUMENTS

| | | | |
|---|---|---|---|
| 4,801,694 | 1/1989 | Scheible et al. | 534/637 |
| 4,994,562 | 2/1991 | Lehmann | 534/618 |

*Primary Examiner*—Fiona T. Powers
*Attorney, Agent, or Firm*—David R. Crichton; Jacob M. Levine; Kevin T. Mansfield

[57] ABSTRACT

A description is given of reactive dyes of formula

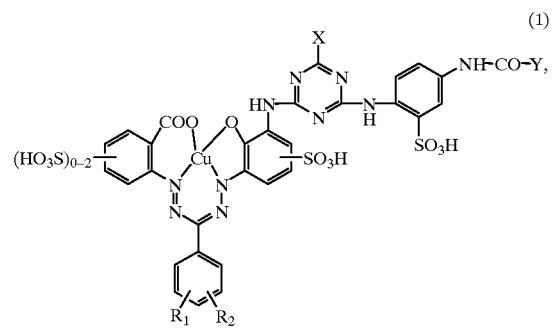

wherein $R_1$ and $R_2$ are each independently of the other hydrogen, sulfo, $C_1$–$C_4$alkyl, $C_1$–$C_4$alkoxy or halogen, X is fluoro or chloro, and Y is a —CHT—CH$_2$T or —CT=CH$_2$ group, and T is bromo or chloro. The reactive dyes of formula (1) are particularly suitable for dyeing or printing cellulosic fiber materials.

13 Claims, No Drawings

REACTIVE DYES, THEIR PREPARATION AND USE

The present invention relates to novel reactive dyes, to a process for their preparation and to the use thereof for dyeing or printing textile fibre materials.

The practice of dyeing with reactive dyes has given rise in recent times to more stringent demands being made on the quality of the dyeings and on the economy of the dyeing process. For this reason, there is still a need for novel reactive dyes with improved properties, especially application properties.

Dyeing today calls for reactive dyes which have sufficient substantivity and which at the same time have good washing off properties with respect to unfixed dye. In addition, the dyes shall have a good tinctorial yield and high reactivity, and they shall also give, in particular, dyeings with high degrees of fixation. The dyes of the prior art do not meet these requirements in all respects.

The present invention therefore has for its object to provide novel improved reactive dyes for dyeing and printing fibre materials and which have the above specified qualities to a high degree. The novel dyes shall be distinguished in particular by excellent fixation yields and superior fibre-dye bond stability, and further they shall have the property of being easily washed off to remove unfixed dye. They shall also produce dyeings with good allround fastness properties, for example lightfastness and wetfastness.

It has been found that this object is substantially achieved with the novel reactive dyes defined below.

This invention relates to reactive dyes of formula

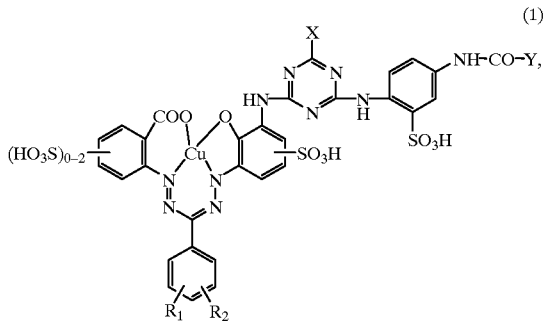

(1)

wherein
$R_1$ and $R_2$ are each independently of the other hydrogen, sulfo, $C_1$–$C_4$alkyl, $C_1$–$C_4$alkoxy or halogen,
X is fluoro or chloro, and
Y is a —CHT—$CH_2$T or —CT=$CH_2$ group, and T is bromo or chloro.

$R_1$ and $R_2$ defined as $C_1$–$C_4$alkyl radicals are suitably, for example, methyl, ethyl, propyl, isopropyl, butyl, sec-butyl, tert-butyl or isobutyl. Methyl or ethyl are preferred.

$R_1$ and $R_2$ defined as $C_1$–$C_4$alkoxy are suitably, for example, methoxy, ethoxy, propoxy, isopropoxy, butoxy or isobutoxy. Methoxy is preferred.

$R_1$ and $R_2$ defined as halogen are suitably fluoro, chloro or bromo. Chloro is preferred.

$R_1$ and $R_2$ are preferably each independently of the other hydrogen, $C_1$–$C_4$alkyl, $C_1$–$C_4$alkoxy or halogen. Hydrogen is preferred.

X is preferably chloro.

Y is preferably a —CHT—$CH_2$T group.

T is preferably bromo.

In the reactive dyes of formula (1), the radical —$(SO_3H)_{0-2}$ is 0 to 2 sulfo groups, in particular 0 or 1 sulfo group and, preferably, 1 sulfo group.

Preferred reactive dyes are those of formula (1), wherein Y is a —CHT—$CH_2$T group, and T is bromo.

Particularly preferred are those reactive dyes of formula (1), wherein $R_1$ and $R_2$ are hydrogen, X is chloro, Y is a —CHT—$CH_2$T group, and T is bromo.

Very particularly preferred reactive dyes are those of formula

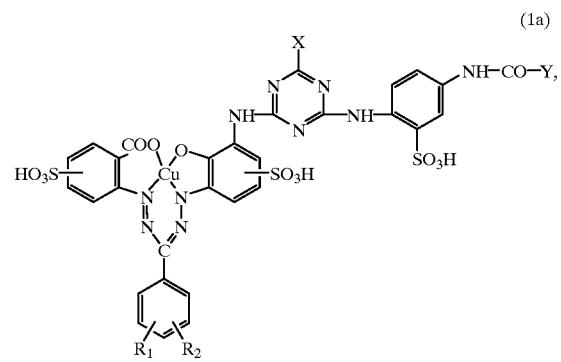

(1a)

wherein $R_1$, $R_2$, X and Y have the meanings and preferred meanings stated above.

Very particularly important reactive dyes are those of formula

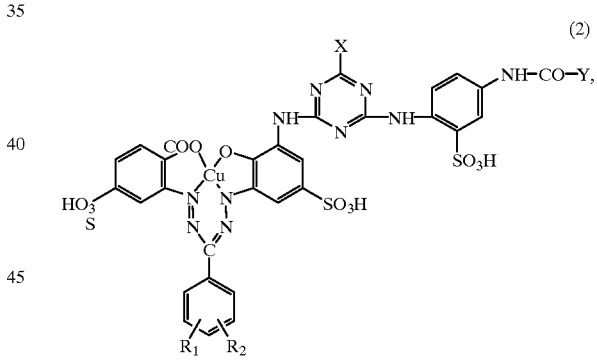

(2)

wherein $R_1$, $R_2$, X and Y have the meanings and preferred meanings stated above.

Particularly interesting reactive dyes are those of formula (2), wherein $R_1$ and $R_2$ are hydrogen, X is chloro, Y is a —CHT—$CH_2$T group, and T is bromo.

The novel reactive dyes comprise sulfo groups which are present either in the form of their free acid or, preferably, as the salts thereof. Suitable salts are, for example, alkali metal salts, alkaline earth metal salts or ammonium salts, salts of an organic amine, or mixtures thereof. Examples to be mentioned are the sodium, lithium, potassium or ammonium salts, and the salt of mono-, di- or triehanol amine.

This invention also relates to a process for the preparation of reactive dyes of formula (1), which comprises reacting a compound of formula

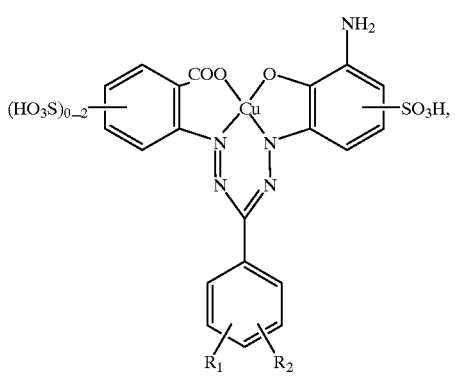

cyanuric chloride or cyanuric fluoride and a diamine of formula

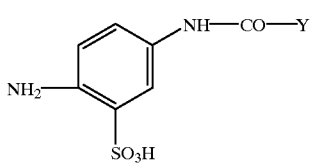

in any order with one another, $R_1$, $R_2$, X and Y having the meanings stated above for formula (1).

The separate process steps indicated above can be carried out in different order, some of them, where appropriate, also simultaneously, so that different processs variants are possible. The reaction is usually carried out in stepwise succession, the sequence of the single processes between the individual reaction components usefully being dependent on the particular conditions.

One processs variant is that, wherein a compound of formula (4) is condensed with cyanuric chloride or cyanuric fluoride and the product obtained is reacted with a compound of formula (3).

The separate condensation reactions are carried out, for example, by processes known per se, usually in aqueous solution, in the temperature range from e.g. 0 to 30° C. and at a pH of e.g. 3 to 7.

The compounds of formulae (3) and (4) are known or can be prepared in analogy to known compounds.

The novel dyes are fibre-reactive. Fibre-reactive compounds are those which are capable of reacting with the hydroxyl groups of cellulose, with the amino, carboxyl, hydroxyl or thiol groups in wool and silk, or with the amino groups and, where appropriate, with the carboxyl groups of synthetic polyamides with formation of covalent chemical bonds.

The novel dyes are suitable for dyeing and printing a very wide range of materials, such as hydroxyl group-containing or nitrogen-containing fibre materials. Typical examples of such materials are silk, leather, wool, polyamide fibers and polyurethanes and, in particular, cellulosic fibre materials of all kinds. Such cellulosic fibre materials are, for example, natural cellulosic fibers, such as cotton, linen and hemp, as well as cellulose and regenerated cellulose. The novel dyes are also suitable for dyeing or printing hydroxyl group-containing fibers which are present in blended fabrics, e.g. mixtures of cotton with polyester fibers or polyamide fibers. The novel dyes are particularly suitable for dyeing or printing cellulosic, in particular cotton-containing, fibre materials.

The conventional dyeing or printing processes may be employed. In addition to containing water and the dyes, the dye liquors or printing pastes may contain further auxiliaries, for example wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

In this process, the amounts of reactive dyes in the dye liquors can vary depending on the desired tinctorial strength. Amounts of 0.01 to 10% by weight, preferably of 0.01 to 6% by weight, based on the goods to be dyed, have usually been found to be advantageous.

Dyeing is preferred for this process, in particular dyeing by the exhaust process.

Dyeing by the exhaust process is usually carried out in aqueous medium, at a liquor ratio of typically 1:2 to 1:60, preferably at a liquor ratio of 1:5 to 1:20, and at a temperature in the range from 20 to 105° C., in particular from 30 to 90° C. and, preferably, from 40 to 80° C.

Another suitable process is the pad-dyeing process, wherein the goods are usually impregnated with aqueous and, where required, saline, dye solutions. The pick-up here is e.g. from 20 to 150%, in particular from 40 to 120% and, preferably, from 50 to 100%, based on the weight of the fibre material to be dyed. Where appropriate, the liquor already contains fixing alkali, or the fibre material is treated with fixing alkali after impregnation. Suitable alkali metals are, for example, sodium carbonate, sodium bicarbonate, sodium hydroxide, disodium phosphate, trisodium phosphate, borax, aqueous ammonia, sodium trichloroacetate, sodium formiate or a mixture of sodium silicate and an aqueous sodium carbonate solution. Preference is given to alkali hydroxide and/or alkali carbonate, in particular to sodium hydroxide and/or sodium carbonate.

Fixation can also be carried out, for example, by the action of heat, such as by steaming the impregnated fibre material at a temperature of e.g. 100 to 120° C., preferably in saturated steam. In accordance with the so-called cold pad-batch method, the dye is applied together with the alkali to the padder and is then fixed by storing for several hours, for example for 3 to 40 hours, at room temperature. After fixation, the dyeings or prints are thoroughly rinsed, if required with addition of a dispersant.

The dyeings and prints obtained are distinguished by good build-up and good levelness. The degree of fixation is high, and unfixed dye can be readily washed off, the difference between degree of exhaustion and degree of fixation being small, i.e. soap loss being small. The dyeings and prints obtained by this process have excellent tinctorial strength and a high fibre-dye bond stability, good fastness to light as well as excellent wetfastness properties, such as fastness to washing, sea-water, cross-dyeing and perspiration, as well as good fastness to pleating, ironing and rubbing.

In another of its aspects, this invention relates to concentrated aqueous formulations which comprise 5 to 50% by weight of at least one reactive dye of the above formula (1). The meanings and preferred meanings indicated above apply to the reactive dyes of formula (1).

The novel aqueous formulations preferably comprise 5 to 40% by weight, more preferably 10 to 40% by weight and, most preferably 10 to 30% by weight, of at least one reactive dye of formula (1).

The formulations are preferably adjusted to a pH from 3 to 8, in particular from 3 to 7 and, preferably, from 4 to 7. The pH is adjusted with a buffer, for example by addition of a poly-phosphate or a hydrogen/dihydrogen phosphate buffer. Other buffers to be mentioned are sodium acetate or potassium acetate, sodium oxalate or potassium oxalate and sodium borate as well as the mixtures thereof.

In addition, the formulations can comprise a component improving the water-solubility of the dye, for example β-caprolactam or N-methylpyrrolidone. These components are normally used in an amount of 0.1 to 30% by weight, based on the total weight of the formulation.

The formulations can also comprise auxiliaries improving their properties, for example surfactants, foam suppressants, antifreezing agents or fungistatic and/or bacteriostatic agents. These auxiliaries are usually present in small amounts, such as from about 1 to 10 g/l each.

The formulations of this invention are storage-stable over a prolonged period of time and are low-viscous and can be used, in particular, in the processes cited above for dyeing.

The novel dyes are distinguished by high reactivity, good fixation and excellent build-up. They can therefore be applied by the exhaust process at low dyeing temperatures and require only short steaming times when used in the pad-steam process. The degree of fixation is remarkably high, and unfixed dye can be readily washed off. The difference between degree of exhaustion and degree of fixation is remarkably small, i.e. the soap loss is very small. The dyes of this invention are also suitable for printing, especially on cotton, and for printing nitrogen-containing fibers, e.g. wool or silk, or blends containing wool or silk.

The dyeings and prints obtained with the dyes of this invention have excellent tinctorial strength and excellent fibre-dye bond stability both in the acid and in alkaline range, and they also have good lightfastness and excellent wetfastness properties such as fastness to washing, water, sea-water, cross-dyeing and perspiration, as well as good fastness to pleating, ironing and rubbing.

The invention is illustrated by the following Examples, in which temperatures are given in degrees Celsius and parts and percentages are by weight, unless otherwise stated. The ratio of parts by weight to parts by volume is the same as that of the kilogram to the liter.

EXAMPLE 1 a) A mixture of 50 parts of water, 200 parts of ice, 16.2 parts of cyanuric chloride and 0.15 part of disodium hydrogen phosphate is placed in a vessel. With stirring, a suspension consisting of 34.4 parts of 4-(2,3-dibromopropionamido)-aniline-2-sulfonic acid and 100 parts of water is added in portions, the pH being kept at about 4 by addition of an aqueous 30% sodium hydroxide solution and the temperature being kept at 0 to 2° C. This mixture is then stirred for about 3 hours at a pH of about 4 and at a temperature of 2 to 8° C.

b) 53.6 parts of the compound of formula

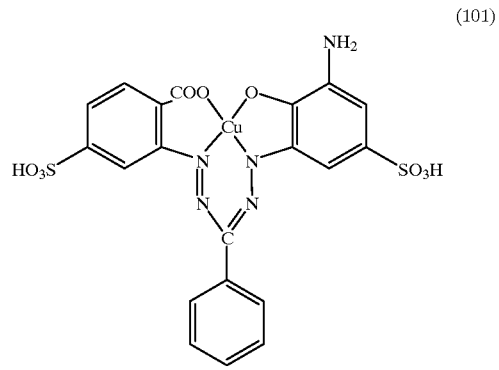

(101)

are suspended in 500 parts of water, the pH is adjusted to 6 with an aqueous 30% sodium hydroxide solution and the suspension is stirred for about 30 minutes at this pH. The mixture obtained according to the instructions of a) is run into the resultant mixture over about 60 minutes, the pH being kept at 6 with an aqueous 30% sodium hydroxide solution and the temperature being kept at 20 to 25° C. The mixture is then stirred for another 60 minutes at pH 6 and at 25° C. The solution is then freed from salt by dialysis and the product so obtained is lyophilised, giving a dye which, in the form of the free acid, corresponds to formula

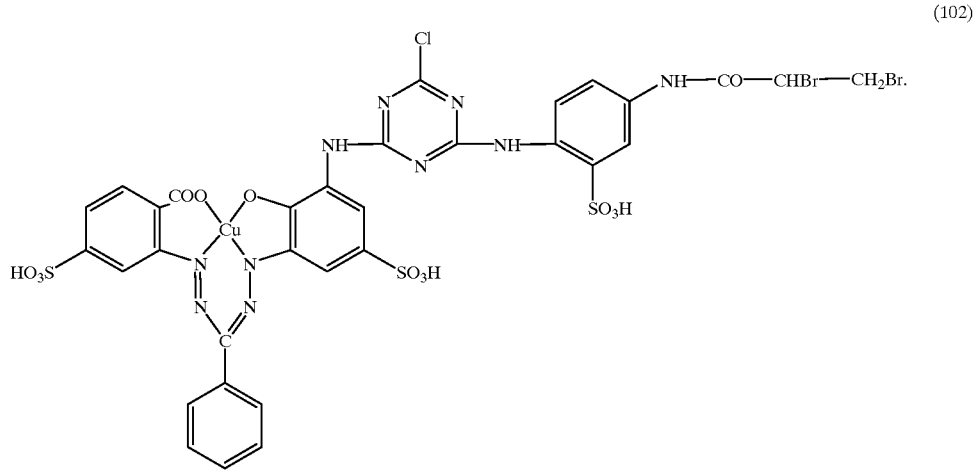

(102)

The dye so obtained dyes cotton in a blue shade.

EXAMPLE 2

The dye obtainable according to Example 1 is treated for about 15 minutes in an aqueous solution adjusted to pH 11 with sodium hydroxide. The solution is then neutralised and the dye is isolated as described in Example 1, giving the dye of formula

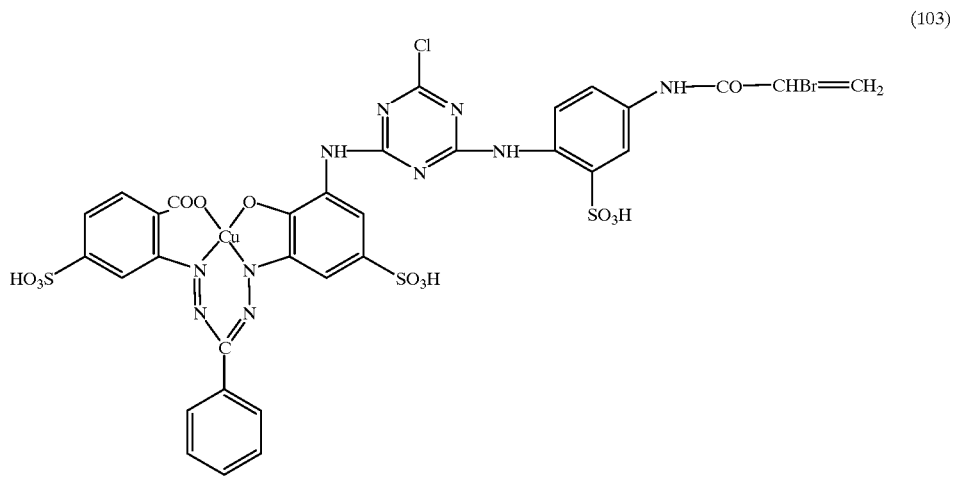

(103)

indicated in the form of the free acid.

The dye so obtained dyes cotton in a blue shade.

EXAMPLES 3 to 5

The dyes of formulae

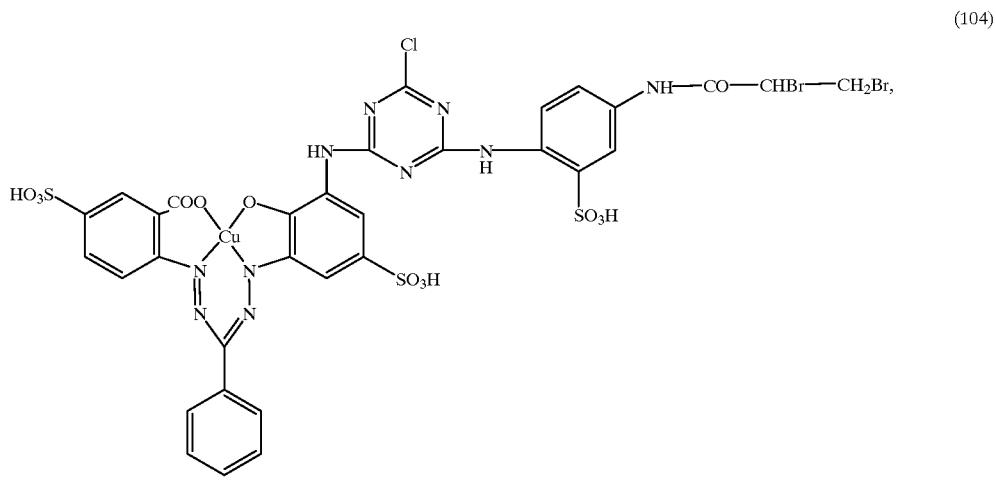

(104)

-continued

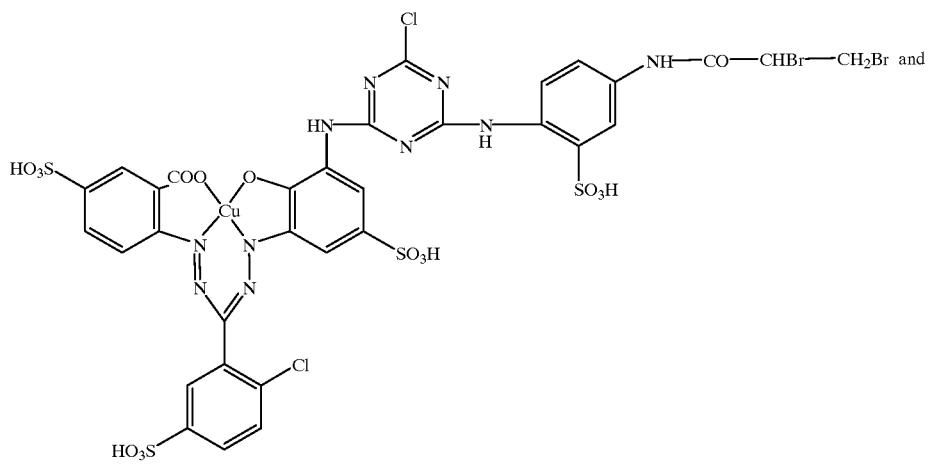
(105)

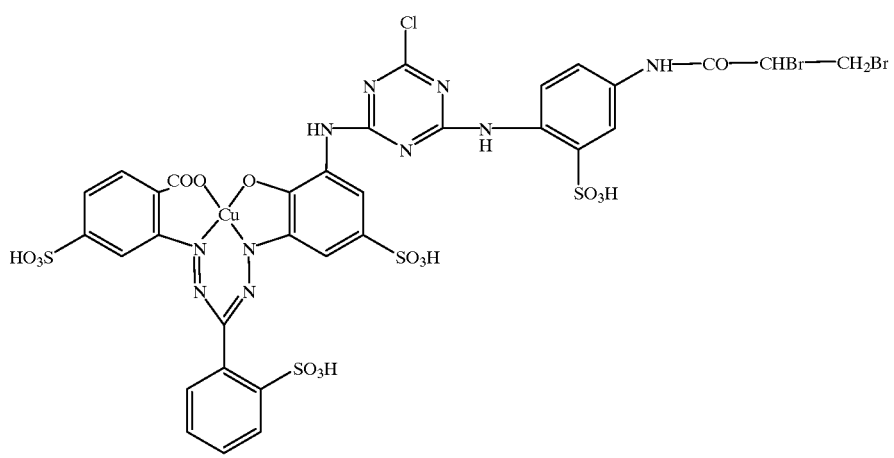
(106)

can be obtained in general analogy to the instructions of Example 1 and dye cotton in a blue shade.

Dyeing Instructions I 2 parts of the dye obtained in Example 1 are dissolved in 400 parts of water. To this solution are added 1500 parts of a solution which contains 53 g/l of sodium chloride. 100 parts of cotton fabric are put into this dyebath at 40° C. and, after 45 minutes, 100 parts of a solution containing 16 g/l of sodium hydroxide and 20 g of calcined sodium carbonate are added. The temperature of the dye bath is kept for another 45 minutes at 40° C. The dyed goods are then rinsed, soaped at the boil for a quarter of an hour with a non-ionic detergent, rinsed again and dried.

Dyeing Instructions II 2 parts of the reactive dye obtained in Example 1 are dissolved in 400 parts of water. To this solution are added 1500 parts of a solution which contains 53 g/l of sodium chloride. 100 parts of cotton fabric are put into this dyebath at 35° C. and, after 20 minutes, 100 parts of a solution containing 16 g/l of sodium hydroxide and 20 g of calcined sodium carbonate are added. The temperature of the dyebath is kept for another 15 minutes at 35° C. The temperature is then raised over 20 minutes to 60° C. and is kept there for a further 35 minutes. The dyed goods are then rinsed, soaped at the boil for a quarter of an hour with a non-ionic detergent, rinsed again and dried.

Printing Procedure 3 parts of the dye obtained in Example 1 are sprinkled, with rapid stirring, into 100 parts of a stock thickening which contains 50 parts of 5% sodium alginate thickening, 27.8 parts of water, 20 parts of urea, 1 parts of sodium m-nitrobenzenesulfonate and 1.2 parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

What is claimed is:

1. A reactive dye of formula

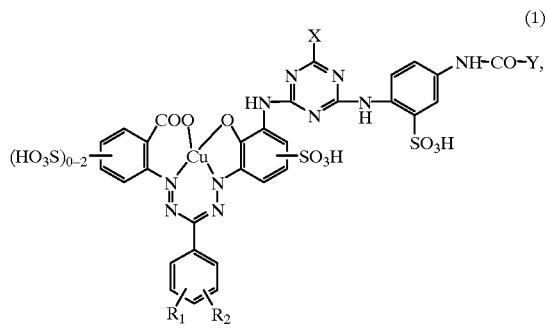

wherein
R₁ and R₂ are each independently of the other hydrogen, sulfo, C₁–C₄alkyl, C₁–C₄alkoxy or halogen,
X is fluoro or chloro, and
Y is a —CHT—CH₂T or —CT=CH₂ group, and T is bromo or chloro.

2. A reactive dye according to claim 1, of formula

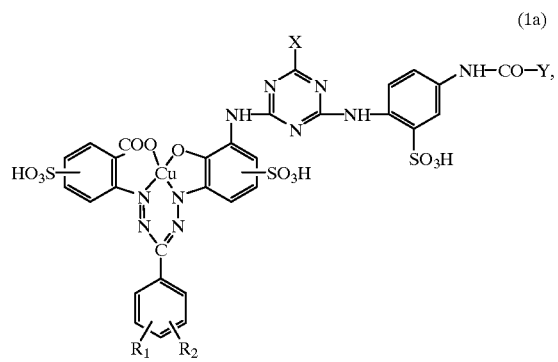

wherein R₁, R₂, X and Y have the meanings defined in claim 1.

3. A reactive dye according to claim 1, of formula

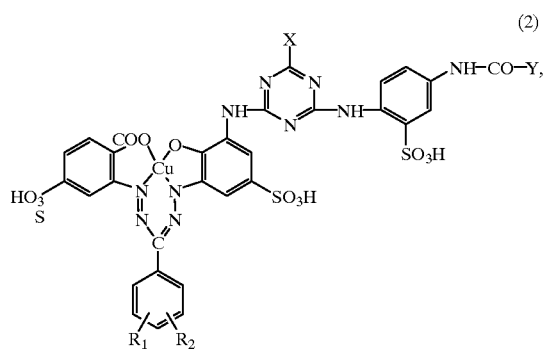

wherein R₁, R₂, X and Y have the meanings defined in claim 1.

4. A reactive dye according to claim 1, wherein R₁ and R₂ are hydrogen.

5. A reactive dye according to claim 1, wherein X is chloro.

6. A reactive dye according to claim 1, wherein Y is a —CHT—CH₂T group.

7. A reactive dye according to claim 1, wherein T is bromo.

8. A reactive dye according to claim 1, wherein Y is a —CHT—CH₂T group, and T is bromo.

9. A reactive dye according to claim 1, wherein

R₁ and R₂ are hydrogen,

X is chloro,

Y is a —CHT—CH₂T group, and T is bromo.

10. A process for the preparation of a reactive dye of formula (1) according to claim 1, which comprises reacting a compound of formula

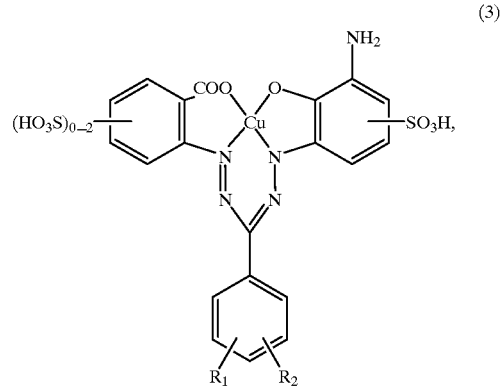

cyanuric chloride or cyanuric fluoride and a diamine of formula

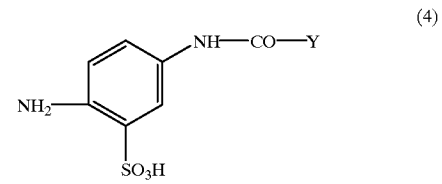

in any order with one another, R₁, R₂, X and Y having the meanings defined in claim 1.

11. A process for dyeing or printing hydroxyl group-containing or nitrogen-containing fibre material, which comprises contacting said fibre material with a tinctorially effective amount of at least one reactive dye of formula (1) according to claim 1.

12. A process according to claim 11, wherein said fibre material is cellulosic fibre material.

13. A concentrated aqueous formulation which comprises 5 to 50% by weight of at least one reactive dye of formula

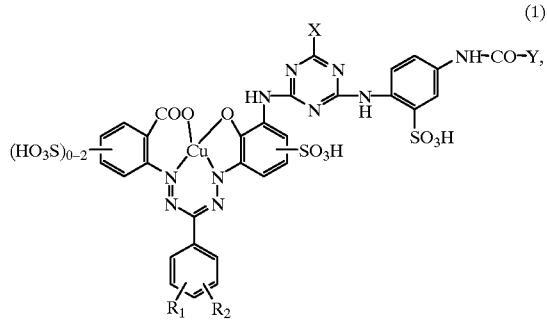
wherein
R₁ and R₂ are each independently of the other hydrogen, sulfo, $C_1$–$C_4$alkyl, $C_1$–$C_4$alkoxy or halogen,
X is fluoro or chloro, and
Y is a —CHT—CH₂T or —CT═CH₂ group, and T is bromo or chloro.
* * * * *